UNITED STATES PATENT OFFICE.

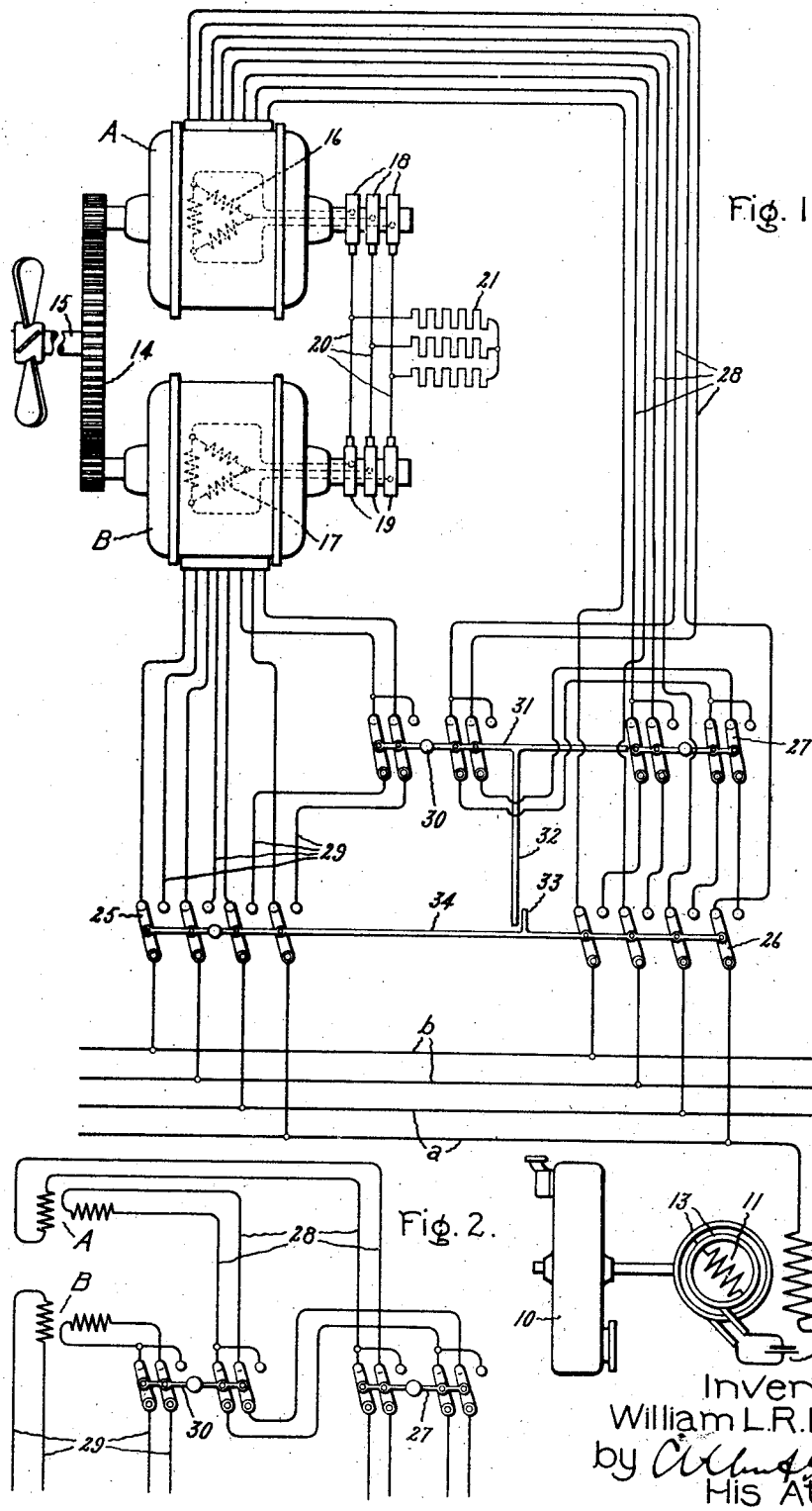

WILLIAM L. R. EMMET, OF SCHENECTADY, NEW YORK, ASSIGNOR TO GENERAL ELECTRIC COMPANY, A CORPORATION OF NEW YORK.

ELECTRIC SHIP PROPULSION.

1,313,079.  Specification of Letters Patent.  Patented Aug. 12, 1919.

Application filed March 23, 1916. Serial No. 86,110.

*To all whom it may concern:*

Be it known that I, WILLIAM L. R. EMMET, a citizen of the United States, residing at Schenectady, county of Schenectady, State of New York, have invented certain new and useful Improvements in Electric Ship Propulsion, of which the following is a specification.

My invention relates to ship propulsion and in particular to the propulsion of ships by electric motors. The object of the invention is generally to provide certain advantageous improvements in electric systems of ship propulsion.
The most severe duty which the propelling apparatus of a ship is called upon to perform is the reversing or even the stopping of the ship after full speed ahead. Where the ship's propellers are driven by electric motors the direction of the ship's movement is reversed by reversing the direction of rotation of the propeller-driving motors. In order to reverse the ship's propellers the motors must be able to overcome the turning force which is imparted to the propellers by the forward movement of the ship, and a very large initial or starting torque of the propeller-driving motors is required for this purpose. In my copending application for Letters Patent of the United States, filed March 23, 1916, Ser. No. 86,109, I have disclosed an interlocking arrangement between the reversing switch and the switch or switches for making the electrical connections of the propeller-driving motor particularly designed for reversal, so as to insure the making of the reversing connections when the reversing switch is thrown to its reversing position. My copending application describes, among others, a propelling equipment comprising two induction motors operatively connected to drive a propeller shaft. The primary windings of these two motors are designed to produce the same number of primary magnetic poles, while the secondary windings are electrically connected together to form under normal operation locally short-circuited paths for the secondary currents of both motors. Suitable means are in addition provided, such for example as means for displacing the angular space relation of the primary magnetic poles of one motor with respect to those of the other, for altering the relative electrical relations of the motors so that substantially opposing electromotive forces will be induced in the electrically connected circuits of the secondary windings. My present invention particularly relates to an equipment of this character. The object of the invention is to provide certain improvements in an electric system of ship propulsion of the character just described, and more particularly to provide such a system with an interlocking arrangement of the type described and broadly claimed in my aforementioned copending application, and, furthermore, to improve the operative relation of the propeller shaft and the two induction motors by providing mechanically independent motors and operatively connecting each motor to the propeller shaft through suitable speed reducing means. Other objects of the invention will be brought out in the course of the following description.

The novel features which I believe to be patentably characteristic of my present invention are definitely pointed out in the claims appended hereto. The principle of the invention and its application to the electric system of ship propulsion in which it is particularly adapted to be embodied will be better understood from the following description taken in conjunction with the accompanying drawings, in which:

Figure 1 diagrammatically illustrates my present invention embodied in a system of electric ship propulsion of the type hereinbefore particularly described, and Fig. 2 is an explanatory diagram of certain of the electrical connections of the primary windings of the propeller-driving induction motors.

The screw propeller of a ship which under the best conditions has rather low efficiency, can be designed for best efficiency at an exceedingly low speed. On the other hand the design of an induction motor for low speed is very difficult, since in general the higher the speed the better is the design of an induction motor. The high speed induction motor is not only cheaper, lighter and more compact, but operates with better power factor and efficiency and greater instantaneous overload capacity. In order to obtain the best efficiency of the propellers and motors I propose to employ two mechanically independent induction motors operatively connected by any suitable speed reducing means, such as reduction gearing, to a propeller shaft.

Referring to Fig. 1 of the drawings, there is diagrammatically represented an elastic fluid turbine 10 mechanically coupled to a polyphase alternator. I have shown for the purpose of illustration an alternator of the revolving field type having an exciting winding 11 supplied with direct current from any suitable source 12 by means of slip rings 13 and coöperating brushes. The alternator carries on its stator a quarter phase armature winding, of which the phases I and II are connected to bus bars $a$ and $b$, respectively.

Two propeller-driving induction motors A and B are directly connected by suitable speed reducing means, such as reduction gearing 14, to a propeller shaft 15. Any suitable type of marine gearing, such as the well known Alquist gearing, may be employed for connecting the shafts of the motors A and B to the propeller shaft.

The stator windings of the motors A and B are wound for the same numbers of poles and are so connected that corresponding poles have relatively the same angular positions in space. The rotors of the two motors A and B are provided with phase wound secondary windings 16 and 17, respectively, which are connected to slip rings 18 and 19, respectively. The two secondary windings are electrically connected together by means of the slip rings 18 and 19 and coöperating conductors 20 so that corresponding poles have relatively the same angular positions in space when the primary magnetic poles of the two motors are similarly related. An external resistance 21 is permanently connected to the conductors 20. The secondary windings of the motors A and B are three phase windings as diagrammatically represented, and, accordingly, three slip rings are necessary for each motor.

Fig. 2 diagrammatically represents the arrangement and electrical connections of the primary windings of the motors A and B. Each of these motors has a quarter phase primary winding designed for pole-changing, and the motors are, therefore, provided with pole-changing switches 25 and 26, respectively. Any of the well known means for producing primary magnetic poles of different pole numbers may be employed to produce the different polar arrangements of the primary windings of the motors A and B, and since there are numerous arrangements for accomplishing this result I do not deem it necessary to specifically explain any particular means, but by way of example, I will mention a patent to Ernst F. W. Alexanderson, 841,609, dated Jan. 15, 1907, as illustrating one way in which the primary windings of the motors A and B may be arranged to produce primary magnetic poles of different pole numbers.

A switch 27 is provided for displacing the primary magnetic poles of the motor A 180 electrical degrees from the corresponding poles of the motor B. The pole-displacing switch 27 is included in leads 28 which when connected to the bus bars $a$ and $b$ through the pole-changing switch 26 establish the low speed pole number of the motor A. The pole-changing switch 25 when connected to leads 29 establishes the corresponding low speed pole number of the motor B. A reversing switch 30 is included in phase I, connected to bus bars $a$, of the leads 28 and 29.

The operation of the apparatus thus far described is as follows: When the pole-changing switches 25 and 26 occupy the positions represented in the drawings the primary windings of the motors A and B are arranged for their high speed pole numbers, and since the poles of both primary and secondary windings have relatively the same angular positions in space the electromotive forces in corresponding sections of the two secondary windings will act in conjunction and, accordingly, the two secondary windings will be in effect series-connected and hence of relatively low resistance. This condition corresponds to the full speed operation of the ship. An efficient cruising speed can be obtained by throwing both pole-changing switches 25 and 26 to their right hand positions, as viewed in Fig. 1, which establishes the low speed polar arrangements of the primary windings of the two propeller-driving motors. If the pole-displacing switch 27 is moved to its right hand position, Figs. 1 and 2, when the pole-changing switches 25 and 26 occupy their right hand positions, Fig. 1, the primary magnetic poles of the motor A become displaced 180 electrical degrees from the primary magnetic poles of the motor B, and, accordingly, corresponding sections of the two secondary windings 16 and 17 are no longer electrically connected in series, but are connected in parallel, wherefore the secondary circuit of each motor must be completed through the external resistance 21. Under this condition the secondary circuits of motors A and B have relatively high resistance and the motors have, accordingly, relatively high starting torques.

The reversing switch 30 operates to reverse phase I of the primary windings of each of the motors A and B. In accordance with my present invention the reversing switch 30 is interlocked with the pole-displacing switch 27 and the pole-changing switches 25 and 26. As diagrammatically represented in Fig. 1 the interlocking means between these four switches comprises a horizontal bar 31 which moves the pole-displacing switch 27 into its pole-displacing position, that is, its right hand position in the drawings, when the reversing switch is moved to its reversing position. A depending arm 32 is secured to the arm 31 and is adapted to engage a lug 33 on an arm 34 rigidly connecting the switches 25 and 26, whereby the switches 25 and 26 are moved to their respective low speed positions, if not already in such positions, when the reversing switch is operated to reverse the motors A and B. When the reversing switch 30 is in its normal or left hand position, as viewed in the drawings, the pole-changing switches 25 and 26 can be freely moved. Similarly, the pole-displacing switch 27 can be freely moved when the reversing switch occupies its normal position.

The pole-displacing switch 27 is associated only with the low speed polar arrangement of the motor A, since efficiency is the main prerequisite with the high speed polar arrangement, and since in general practice it will only be desirable to include the external resistance 21 in the secondary circuits of the propeller-driving motors for the low speed pole arrangement. Movement of the pole-displacing switch 27 to its pole-displacing position thus operates to electrically include the external resistance 21 in the secondary circuits of the motors A and B, thereby providing the high starting torque which is necessary for reversing or stopping after full speed ahead. The particular connections designed to produce the required motor characteristics for reversing the ship are thus effected by moving the pole-changing switches 25 and 26 to their low speed positions and simultaneously moving the pole displacing switch 27 to displace the primary magnetic poles of the motor A 180 electrical degrees from the corresponding poles of the motor B. These switches are, in accordance with my present invention, so interlocked with the hand operated reversing switch 30 that the making of these particular motor connections for reversing are insured and further so that the electrical connections of the motors cannot be altered while the reversing switch is in its reversing position.

The interlocking means between the reversing switch and the other switches for making the motor connections for reversal will be in practice of suitable design and character to meet the mechanical and electrical requirements of the equipment in hand. It will of course be understood that the interlocking means has been illustrated in the accompanying drawings in an elementary manner merely for the purpose of explaining my invention in a simple way.

Those skilled in the art will readily understand that in carrying the invention out in practice oil switches and any mechanical, magnetic, or other type, of interlocking means may be employed.

The speed reducing gearing between the motors and the propeller shaft enables the motors and propellers to be operated at more nearly their most efficient speeds than in equipments where the motors are direct-coupled to the propeller shaft. The provision of pole-changing for the motors provides in addition two efficient speeds of the propellers and motors. The speed reducing gearing is moreover of particular advantage in reversing, since the real need in reversing is not high propeller speed, but high torque with a reduced propeller speed. The capacity of a ship's power plant is limited by the available space. This capacity is taxed to its maximum by the very severe requirements of reversing after full speed ahead, and unless this capacity is capable of developing sufficient torque to break the propellers away from the water it is not satisfactory for reversing conditions. A greater torque can be developed from the same available capacity by decreasing the propeller speed, and the speed reducing gearing between the motors and propeller shaft of my present equipment can be so designed that a very satisfactory reversing torque is obtained with the low speed polar arrangement of the motors. The increase in the resistance of the secondary circuits of the motors occasioned by shifting the relative angular space relations of the primary poles of the motors furthermore advantageously accentuates the motor torque. On the other hand under normal full speed running or cruising the external resistance is entirely inactive and no part of the secondary current flows therethrough, so that the propeller-driving motors have low resistance secondary circuits and hence operate with high efficiency.

What I claim as new and desire to secure by Letters Patent of the United States, is:—

1. An electric system of ship propulsion comprising a propeller shaft, two induction motors, speed reducing gearing operatively connecting each of said motors to said shaft, a primary winding and a secondary winding for each motor, the secondary windings of the two motors being electrically connected together to form under normal operation locally short-circuited paths for the secondary currents of both motors, means for altering the relative electrical relations of said motors whereby substantially opposing electromotive forces are induced in the electrically connected circuits of said secondary windings, and a resistance electrically connected to both secondary windings so as to provide a path for the secondary currents when opposing electromotive forces are induced in the electrically connected circuits of said secondary windings.

2. An electric system of ship propulsion comprising a propeller shaft, two independently operating induction motors, speed reducing means operatively connecting each motor to said shaft, said motors having primary windings adapted to produce the same number of primary magnetic poles having normally the same relative angular positions in space, a secondary winding for each of said motors, an external resistance, said secondary windings being electrically connected to each other and to said resistance so as to form a low resistance path for the secondary currents of both motors when the primary magnetic poles of both motors have substantially the same angular positions in space and so as to form a relatively high resistance path for such secondary currents when the primary magnetic poles of the two motors are displaced in space, and means for displacing the angular space relation of the primary magnetic poles of one motor with respect to the primary magnetic poles of the other motor.

3. An electric system of ship propulsion comprising a propeller shaft, two induction motors, gearing operatively connecting each of said motors to said shaft, each of said motors having a primary winding and a secondary winding, the secondary windings of the two motors being electrically connected together so that corresponding sections of the two secondary windings are normally connected in series relation, means for displacing the angular space relation of the primary magnetic poles of one motor with respect to the primary magnetic poles of the other motor whereby substantially opposing electromotive forces are induced in corresponding sections of said secondary windings, and a resistance electrically connected to both secondary windings so as to provide a path for the secondary currents when the primary magnetic poles of one motor are angularly displaced in space with respect to the primary magnetic poles of the other motor.

4. An electric system of ship propulsion comprising a propeller shaft, two induction motors, speed reducing gearing operatively connecting said motors to said shaft, said motors having primary windings adapted to produce the same number of primary magnetic poles having normally the same angular positions in space, means electrically connecting the secondary windings of said motors so as to form a low resistance path for the secondary currents of both motors when the primary magnetic poles of the motors have substantially the same angular positions in space and so as to form a relatively high resistance path for such secondary currents when the primary magnetic poles of the motors are relatively displaced in space, and means for displacing the angular space relation of the primary magnetic poles of one motor with respect to the primary magnetic poles of the other motor.

5. An electric system of ship propulsion comprising a propeller shaft, two induction motors, speed reducing gearing operatively connecting said motors to said shaft, secondary windings for said motors electrically connected together to form under normal operation locally short-circuited paths for the secondary currents of both motors, means for altering the relative electrical relations of said motors whereby substantially opposing electromotive forces are induced in the electrically connected circuits of said secondary windings, and means providing a path for the secondary currents when opposing electromotive forces are induced in the electrically connected circuits of said secondary windings.

6. An electric system of ship propulsion comprising a propeller shaft, two induction motors operatively connected to drive said shaft, said motors having primary windings adapted to produce primary magnetic fields of a particular pole number and primary magnetic fields of a second and different particular pole number, means for reversing the direction of rotation of said motors, secondary windings for said motors electrically connected together to form under normal operation locally short-circuited paths for the secondary currents of both motors, means for altering the relative electrical relations of said motors whereby substantially opposing electromotive forces are induced in the electrically connected circuits of said secondary windings, means for insuring the operation of said last mentioned means to alter the relative electrical relations of said motors when said reversing means is operated to reverse the motors, and means providing a path for the secondary currents when opposing electromotive forces are induced in the electrically connected circuits of said secondary windings.

7. An electric system of ship propulsion comprising a propeller shaft, two induction motors, speed reducing means operatively connecting said motors to said shaft, said motors having primary windings adapted to produce primary magnetic fields of a particular pole number having normally the same angular positions in space, and primary magnetic fields of a second and different particular pole number having normally the same angular positions in space, means electrically connecting the secondary windings of said motors so as to form a low resistance path for the secondary currents of both motors when the primary magnetic poles of the motors have substantially the same angular positions in space and so as to form a relatively high resistance path for such secondary currents when the primary magnetic poles of the motors are relatively displaced in space, means for reversing the direction of rotation of said motors, means for displacing the angular space relation of the primary magnetic poles of one motor with respect to the primary magnetic poles of the other motor, and means for insuring the displacement of the angular space relation of the primary magnetic poles of the motors by said last mentioned means when said reversing means is operated to reverse the motors.

8. An electric system of ship propulsion comprising a propeller shaft, two induction motors operatively connected to drive said shaft, said motors having primary windings adapted to produce primary magnetic fields of a particular pole number with normally the same angular positions in space and primary magnetic fields of a second and different pole number with normally the same angular positions in space, a secondary winding for each motor, a common resistance electrically connected to corresponding points of each secondary winding, means for displacing the angular space relation of the primary magnetic poles of one motor with respect to the primary magnetic poles of the other motor, means for reversing the direction of rotation of said motors, and means coöperating with said last mentioned means and with said pole-displacing means for insuring the displacement of the angular space relation of the primary magnetic poles of the motors when said reversing means is operated to reverse said motors.

9. An electric system of ship propulsion comprising a propeller shaft, two induction motors operatively connected to drive said shaft, said motors having primary windings adapted to produce primary magnetic fields of a particular pole number with normally the same angular positions in space and primary magnetic fields of a second and different particular pole number with normally the same angular positions in space, a secondary winding for said motors providing a low resistance path for the secondary currents of both motors when the primary magnetic poles of the motors have the same angular positions in space, pole-displacing means for displacing the angular space relation of the primary magnetic poles of one motor with respect to the primary magnetic poles of the other motor, reversing means for reversing the direction of rotation of said motors, and means coöperating with said pole-displacing means and with said reversing means for insuring the displacement of the angular space relation of the primary magnetic poles of the motors when said reversing means is operated to reverse said motors.

10. An electric system of ship propulsion comprising a propeller shaft, two induction motors operatively connected to drive said shaft, said motors having primary windings adapted to produce primary magnetic fields of a particular pole number with normally the same angular positions in space and primary magnetic fields of a second and different particular pole number with normally the same angular positions in space, pole-changing means for the primary winding of each motor, a secondary winding for each motor, a common resistance electrically connected to corresponding points of each secondary winding, pole-displacing means for displacing the angular space relation of the primary magnetic poles of the motor with respect to the primary magnetic poles of one other motor, reversing means for reversing the direction of rotation of said motors, and means coöperating with said pole-changing and said pole-displacing means and with said reversing means for insuring the low speed polar arrangement and the displacement of the angular space relation of the primary magnetic poles of the motors when said reversing means is operated to reverse said motors.

In witness whereof I have hereunto set my hand this 22nd day of March, 1916.

WILLIAM L. R. EMMET.